United States Patent [19]

Garces

[11] Patent Number: 4,677,360
[45] Date of Patent: Jun. 30, 1987

[54] FIELD WEAKENING INDUCTION DRIVE

[75] Inventor: Luis J. Garces, Earlysville, Va.

[73] Assignee: General Electric Company, Charlottesville, Va.

[21] Appl. No.: 839,203

[22] Filed: Mar. 13, 1986

[51] Int. Cl.[4] ............................................. H02P 5/40
[52] U.S. Cl. ..................................... 318/803; 318/805
[58] Field of Search .......... 318/800, 803, 805, 807–812

[56] References Cited

U.S. PATENT DOCUMENTS

| | | | |
|---|---|---|---|
| 4,310,791 | 1/1982 | Akamatsu | 318/800 |
| 4,338,559 | 7/1982 | Blaschke et al. | 318/805 |
| 4,484,128 | 11/1984 | Jotten et al. | 318/803 |

Primary Examiner—David Smith, Jr.
Attorney, Agent, or Firm—James H. Beusse; Irving M. Freedman

[57] ABSTRACT

A speed control using decoupled flux and torque commands obtains constant horsepower operation by modifying the slip according to the torque requirements. The slip is modified by a value representative of the torque producing current. Control is kept in the torque command and the slip command with the field producing command free to change according to the motor speed, voltage available and the rotor time constant.

6 Claims, 8 Drawing Figures

FIELD WEAKENING INDUCTION DRIVE

BACKGROUND OF THE INVENTION

This invention relates to an induction motor drive operable in the field weakening mode (constant horsepower operation) and more particularly to a motor drive using a vector control operable in the field weakening mode using full inverter output voltage.

Vector control of an induction machine allows the optimal use of the dynamic capabilities of the motor as a prime mover. Vector control relies on the elimination of the undesirable dynamics of the stator impedances, which can vary by more than 100%, by using stator current control. The stator currents are measured and used in a closed loop control which provides as an output the required voltage command, which is supplied to the motor.

The vector control can be explained by noting that generically AC and DC machines are analogs, and this analogy becomes clearer if the stator currents of an AC machine are converted from a stationary reference frame to a synchronized rotating reference frame. In a separately-excited dc shunt machine, torque is produced as a product of field flux produced by field current, and armature current. Because the field flux and armature current are physically located so as to be orthogonal, there is no interaction or coupling between the torque producing factors (not taking into account saturation and armature reaction effects). No coupling between the armature current and flux means that if the armature current, for example, is varied, the torque will change proportionally without variation in flux or field current producing the flux.

In an AC machine the torque is also proportional to the product of flux and current. The flux and current are both alternating variables and it is necessary to resolve them into two quantities using the equivalent two phase machine model with an x-y reference frame, which rotates together with the rotor flux. Stator current components $i_{1x}$, $i_{1y}$ influence both the rotor flux and torque. That is, if either component of the current is changed to influence the torque, the flux will also change. However, a "decoupling" can be accomplished by orienting the rotating x-y coordinates to a position where the y axis coincides with the resultant rotor flux vector. In this new reference frame, only the stator component $i_{1y}$ influences the flux, while the $i_{1x}$ component builds the torque. Thus by using a torque producing current command of $i_{1x}$* proportional to slip and a flux producing current command of $i_{1y}$*, determined from machine voltage, rapid torque response and accurate torque regulation can be achieved, since the two commands are decoupled. Both current component commands are dc quantities during steady state operation.

When constant horsepower operation is desired in a vector control, several approaches have been followed in the past. The commanded flux level can be open loop controlled by varying the field producing current command $i_{1x}$*, in a way that always assures that enough voltage reserve is left for current control. The open loop-field oriented control (flux determined open loop), allows the regulation of the rotor flux only when the commanded current and the actual stator current coincides. This requires that the bandwidth of the current control is wide enough to guarantee that, even at the maximum stator frequency, the current error (amplitude and phase) is acceptable. At the same time, the rating of the motor and inverter have to be matched so that enough voltage reserve is always available for the current control to work. This control requires knowledge of dc link voltage available and full six step inverter operation cannot be achieved.

Another control method of obtaining constant horsepower is to transition to a voltage control mode of operation, by computing the required switching pattern inversely proportional to motor speed. This control requires a knowledge of the dc link voltage available and full six step inverter operation cannot be achieved.

An angle control with the angle between the main flux and the total stator current being controlled, can be utilized to obtain full six step inverter voltage operation above base speed (which includes constant horsepower region) if the torque producing component of the stator current is used to generate the angle command. However the angle control does not achieve the dynamic response of the vector control system.

A six step inverter can be used where the magnitude of the dc link voltage is controlled. Full six step operation in the constant horsepower region can be achieved, however it is suitable only for low performance drives such as compressors and pumps and is not suitable for servo and spindle drives, since precise speed control with smooth changes in speed cannot be obtained.

It is an object of the present invention to provide an induction machine drive operable in the constant horsepower region using full inverter voltage and having good dynamic response.

It is a further object of the present invention to provide an induction machine drive operable in the constant horsepower region using full inverter voltage without sacrificing any of the high performance capability in the constant torque low speed mode of operation.

It is a still further object of the present invention to provide an induction machine drive operable in the constant horsepower region using full inverter voltage while improving the performance capability in the constant torque low speed mode of operation.

SUMMARY OF THE INVENTION

In one aspect of the present invention a control capable of operating an induction machine at full inverter voltage in the field weakening mode is provided. A speed error signal is generated from an external speed command and a signal representative of actual machine speed. A torque producing current command signal is generated responsive to the speed error signal and supplied to limiting means for limiting the maximum magnitude of the torque producing current command. A signal representative of the actual torque producing current signal is generated from machine voltages and currents. An error signal from the difference between the generated actual torque producing current and the limited torque producing current command is used to generate a slip correction signal. The slip command signal is modified by the slip correction signal to generate a modified slip command. The slip command signal is increased by the slip correction signal when the limited torque producing current command signal exceeds the actual torque producing current signal. A flux producing current command signal is generated, responsive to induction machine speed. The limited torque producing current command signal, flux producing current command signal and the modified slip command are supplied to a current control and converter means for generating multiphase, variable frequency power to the induction machine.

BRIEF DESCRIPTION OF THE DRAWING

The features of the invention believed to be novel are set forth with particularity in the appended claims. The invention itself, both as to organization and method of operation, may best be understood by reference to the following description taken in conjunction with the accompanying drawing in which:

DETAILED DESCRIPTION OF THE INVENTION

Figure 1:
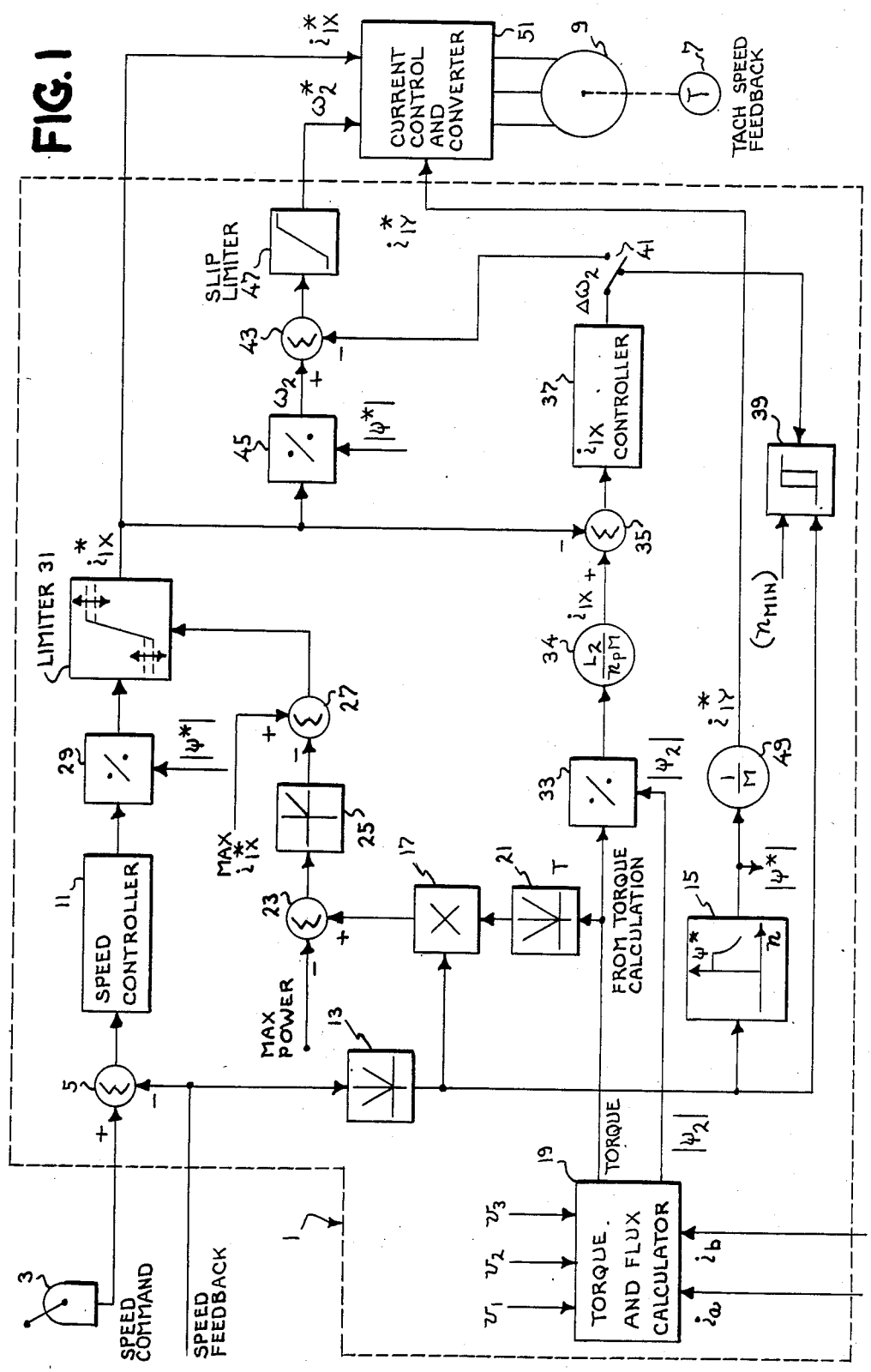
FIG. 1 is a block diagram representation of an analog implementation of a drive allowing operation of an induction motor in the constant horsepower region using full inverter voltage, in accordance with the present invention.

Referring now to the drawing wherein like numerals indicate like elements throughout, there is shown in FIG. 1 an induction motor drive. A speed command from a speed regulator 3, such as a spindle speed regulator or a servo control, is supplied to summing junction 5, where the speed command is compared to a tachometer speed feedback signal from a tachometer 7 which is driven by the shaft of controlled induction motor 9. The output signal from summing junction 5 is an error signal representing the difference between the speed command and the tachometer speed feedback signal. The error signal is passed through a speed controller 11 which can comprise a proportional plus integral regulator.

The speed feedback signal is also supplied to an absolute value circuit 13. A flux generator 15 receives the absolute value of the speed feedback signal from circuit 13 and provides a flux command $\psi^*$. The absolute value of the speed feedback signal is also provided as one input to a two input multiplier 17. A calculated torque signal from a torque and flux calculator 19 is supplied to an absolute value circuit 21 and the absolute value circuit 21 provides the other input to multiplier 17. Torque and flux calculator 19 is shown in more detail in FIG. 2. Torque and flux calculator 19 is responsive to induction motor line voltages $V_1$, $V_2$ and $V_3$ (measured relative to the dc link negative voltage) and to the motor current represented by $i_a$ and $i_b$. The output of multiplier 17 provides a representation of the actual output power taken from or put into the drive which is compared in a summing junction 23 to the maximum allowed power. A regulator 25 provides a signal proportional to the difference of the actual power and the maximum allowed power when the actual difference exceeds the allowed power. This difference signal is compared to the maximum allowed torque producing current command $i_{1x}^*$ in summer 27.

The output of the speed controller 11 is a torque command which, in a divider circuit 29, is divided by the flux command $\psi^*$ from flux generator 15. The output of the divider circuit 29 is a torque producing current command which is limited by limiter circuit 31. The magnitude of the positive error signal at summing junction 23 determines the reduction of the limits from the maximum allowed value of the torque producing current command.

The torque signal from the torque calculator 19 is divided by the absolute value of the rotor flux $\psi_2$ in divider 33 and then multiplied by the factor $L_2/n_pM$, in gain current 34, where $L_2$ is the total rotor inductance, $n_p$ is the number of pole pairs and M is the mutual inductance of the induction machine, to generate a calculated signal representative of the torque producing current component signal. The calculated signal is compared to the commanded signal in summer 35.

A calculated torque producing current component signal controller ($i_{1x}$ controller) 37, which can comprise a proportional plus integral regulator, provides an adjustment to the slip command $\Delta\omega_2$ according to the torque requirements. When the induction machine 9 is above a predetermined speed $n_{min}$ such as 10% of base speed, a comparator with hysteresis 39 closes switch 41, connecting the output of the $i_{1x}$ controller 37 to summing junction 43 where a slip command is supplied by divider 45 which receives a torque producing component of current command from limiter 31 as a dividend and the commanded flux $\psi^*$ as a divisor from flux generator 15. A slip limiter 47 receives the modified slip signal from summing junction 43 and provides a slip command.

A flux producing component of stator current command $i_{1y}^*$ is obtained from a gain circuit 49 which divides the commanded flux signal by the induction machine mutual inductance M. The commanded torque and the flux producing component of the stator current $i_{1x}^*$ and $i_{1y}^*$ respectively, as well as the commanded slip $\omega_2^*$ are supplied to a current control and converter 51 which in turn is coupled to the induction machine 9.

Figure 2A:
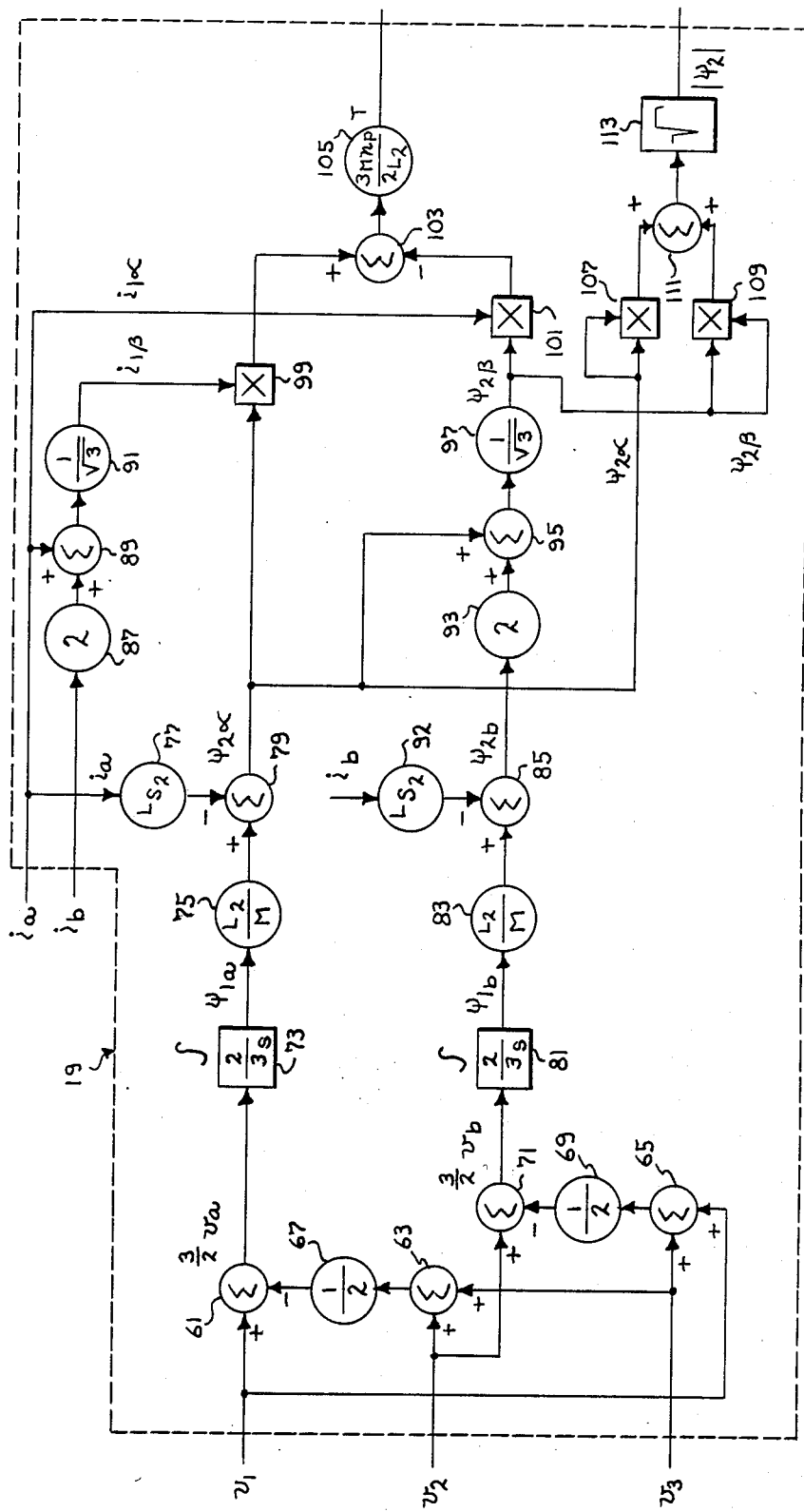
FIG. 2A is a block diagram showing the torque and flux calculator of FIG. 1 in more detail.
Figure 2B:
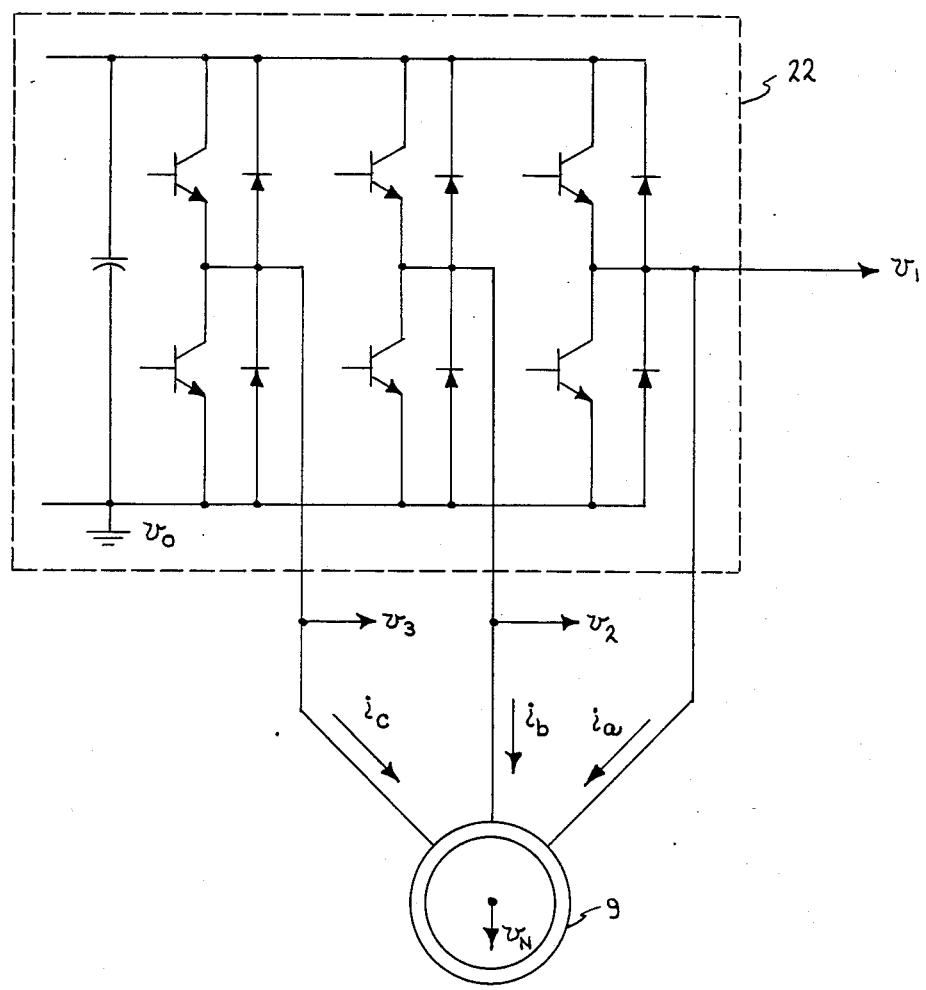
FIG. 2B is a schematic representation of a transistor inverter and an induction motor showing the voltage and current inputs used by the torque and flux calculator.
Figure 3:
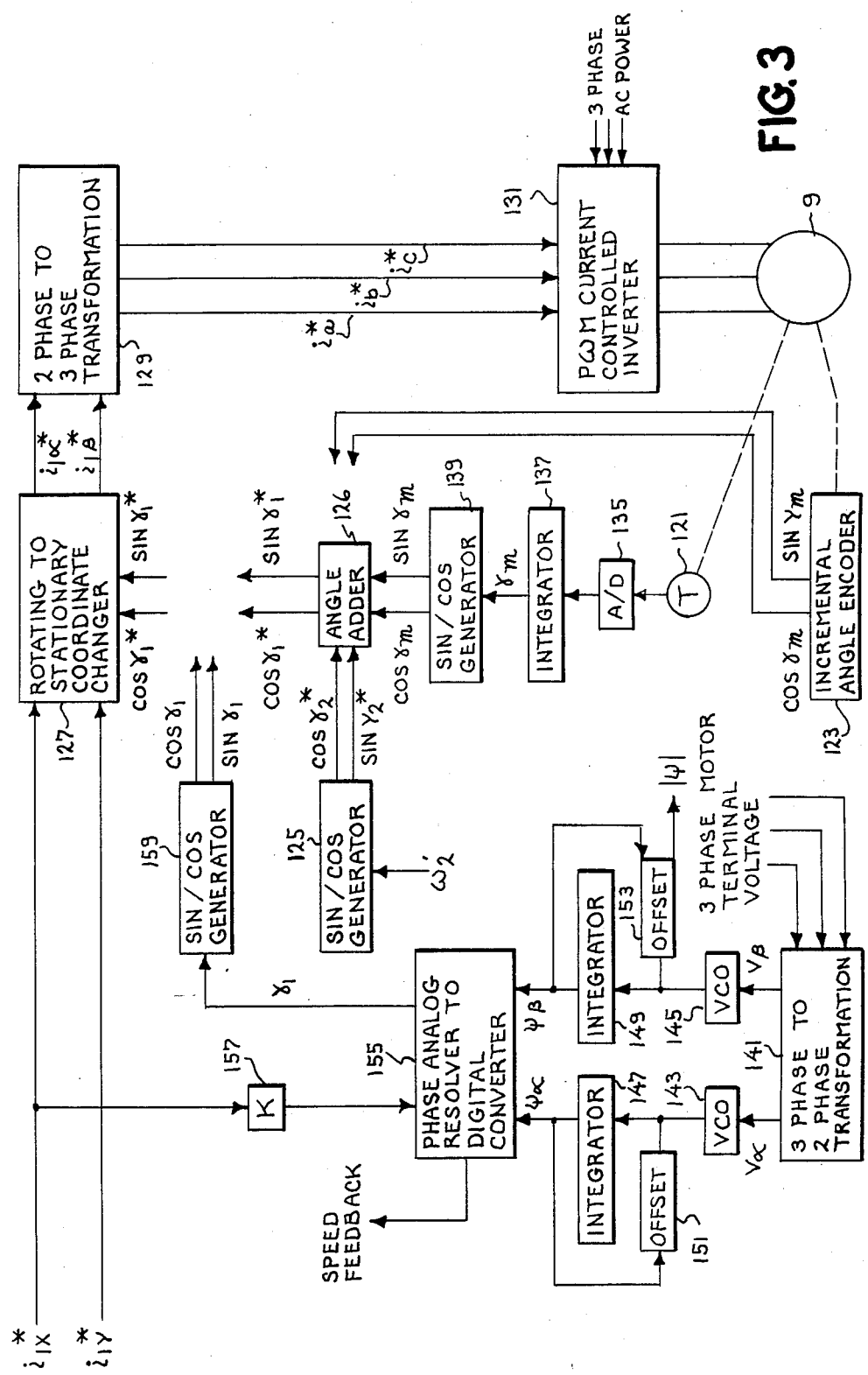
FIG. 3 shows an inverter and control responsive to the output of the speed controller of the present invention.
Figure 4:
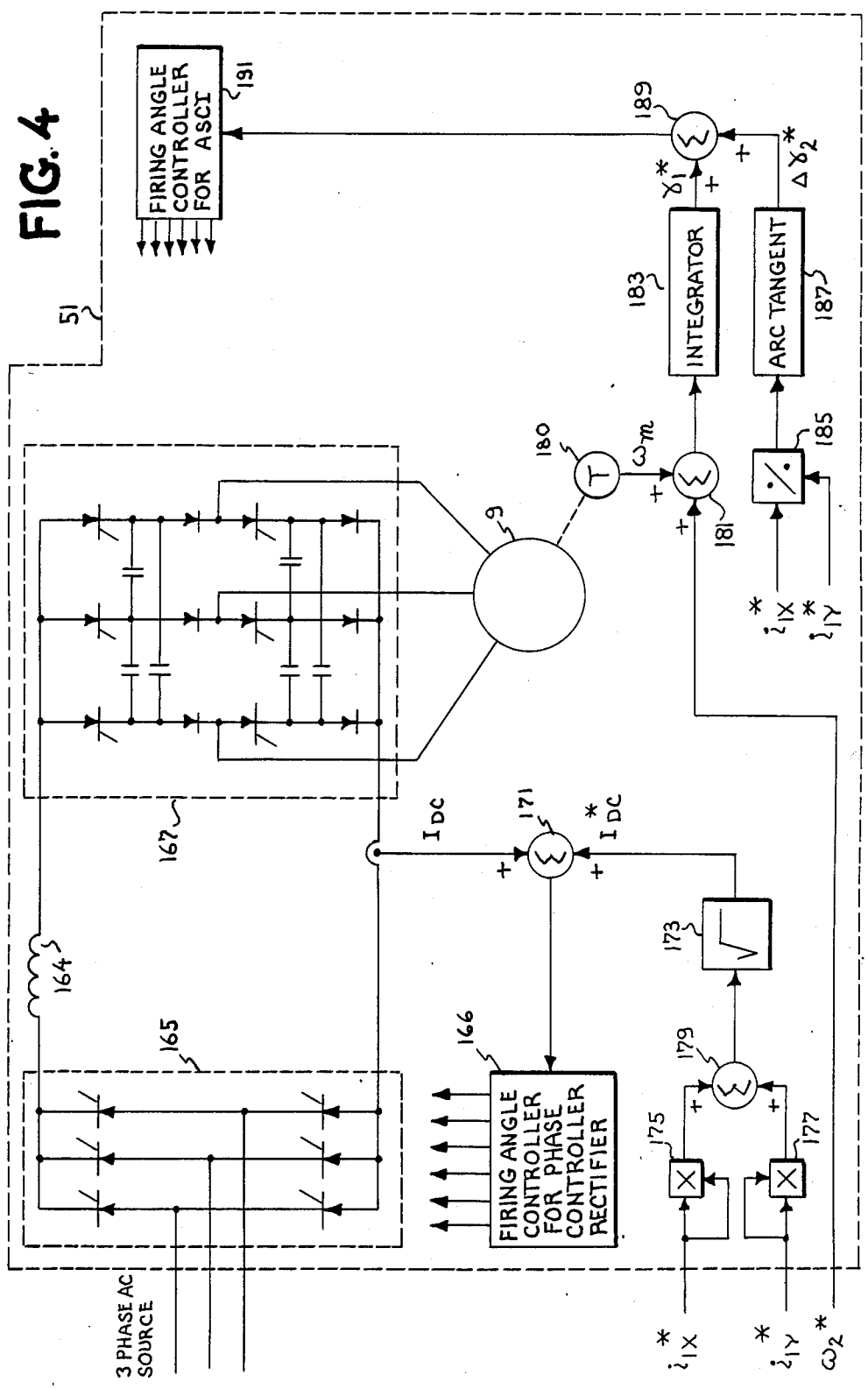
FIG. 4 shows another embodiment of the inverter and control responsive to the output of the speed controller of the present invention.

Current control and converter 51 can comprise any current control voltage inverter control scheme for an induction motor. A vector control coupled to an inverter is shown in FIG. 3 and a variable voltage variable frequency square wave drive with an autosequentially commutated inverter is shown in FIG. 4. Referring now to FIG. 2A the torque and flux calculator 19 of FIG. 1 is shown in more detail. The motor line voltages $v_1$, $v_2$, $v_3$ measured relative to the negative rail of the dc link, are input to summing junction 61, 63 and 65, respectively. Voltages $v_2$ and $v_3$ are summed in summing junction 63 and multiplied by $\frac{1}{2}$ in gain circuit 67.

The output of gain circuit 67 is coupled to summing junction 61 where $\frac{1}{2}(v_2+v_3)$ is subtracted from $v_1$ to obtain $3/2\ v_a$, where $v_a$ is a motor phase voltage. Voltages $v_1$ and $v_3$ are summed in summing junction 65 and multiplied by $\frac{1}{2}$ in gain circuit 69. The output of gain circuit 69 is subtracted from $v_2$ in suming junction 71. The content of summing junction 71 is $3/2\ v_b$, where $v_b$ is another phase voltage of the motor. An integrator 73, integrates the phase voltage from summing junction 61 to obtain a stator component flux signal $\psi_{1a}$. A gain circuit 75 receives the output signal from integrator 73 and multiplies it by $L_2/M$ where $L_2$ is the total rotor inductance and M is the mutual inductance.

Motor line current $i_a$ from one of the three phases of the motor is multiplied by $L_{s2}$, where $L_{s2}$ is the rotor leakage inductance, in multiplier 77. The output of multiplier 77 is subtracted from the output of multiplier 75 in summing junction 79 to provide $\psi_{2a}$. $\psi_{2a}$ is a component of the rotor flux vector in a 2 phase stator fixed reference fram equivalent circuit.

Integrator 81 receives the machine phase voltage and integrates it to obtain a stator flux component signal $\psi_{1b}$. The stator flux is multiplied by $L_2/M$ in gain circuit 83 and the output of gain circuit 83 is input to summing juction 85. A motor current $i_b$, representative of the actual motor current, is doubled in gain circuit 87 and summed with motor current $i_a$ in summing junction 89. The sum is multiplied by $1/\sqrt{3}$ in gain circuit 91 to obtain $i_B$, a current component of the two phase stator fixed reference frame equivalent circuit. The current $i_b$ is multiplied by the rotor leakage inductance $L_{s2}$ in gain circuit 92 and the results subtracted from the output of multiplier 83 in summing junction 85 to obtain a component of the rotor flux $\psi_{2b}$ in the 2 phase rotor fixed reference frame.

To obtain a component of the stator fixed reference frame flux $\psi_{2\beta}$ the output of the summing junction 85 is doubled in gain circuit 93 and added to the $\psi_{2a}$ signal in summing junction 95. The output of summing junction 95 is multiplied by $1/\sqrt{3}$ in gain circuit 97. To obtain the calculated motor torque T the flux $\psi_{2a}$ is multiplied by $i_{1\beta}$ in multiplier 99 and flux 104 $_{2\beta}$ is multiplied by $i_{1\alpha}$ in multiplier 101. The difference between the outputs of multipliers 99 and 101 is determined in summing junction 103. The output of summing junction 103 is multiplied by $3Mn_p/2L_2$ in multiplier 105 where $n_p$ is number of pole pairs in the induction machine the $L_2$ is the total rotor inductance. The absolute value of the rotor flux is obtained by squaring $\psi_{2\alpha}$ in multipler 107 and squaring $\psi_{2\beta}$ in multiplier 109 and summing the result in summing junction 111. The square root of the sum of the squares is obtained in block 113.

The operation of the field weakening induction drive of FIG. 1 will now be explained. In order to obtain constant horsepower operation, the flux is supposed to be reduced as a function inversely proportional to the rotor speed, and the slip frequency has to be increased proportionally with the frequency. The reduction of flux will be automatic if the stator voltage is kept constant in amplitude while the stator frequency increases, as can be seen from the following steady state approximation $$|\psi| \simeq \frac{|v|}{f_1} \simeq \frac{|v|}{n} \quad |\psi| \simeq \frac{|v|}{f_1} \simeq \frac{|v|}{n} \tag{1}$$

Where $\psi$=flux, n=speed, v=stator voltage and $f_1$=stator frequency. The approximation is also used in the torque and power computation, the following equations can be written $$T = K|\psi|^2 \omega_2 = (|V|/f_1)^2 K \omega_2 = K(|V|/n)^2 \omega_2 \tag{2}$$

$$P = Tn \simeq K(|V|^2/n)\omega_2 \tag{3}$$

Where T=torque, K=constant, $\omega_2$=slip.

It follows, that if power is to be kept constant when v is constant then:

$$\omega_2 \simeq K_1 n \tag{4}$$

$$\psi \simeq K_2/n \tag{5}$$

where $K_1$, $K_2$ are constants.

Dynamically however, the two conditions in equations (4) and (5) will not assure a smooth transition into and out of the constant voltage region or assure good dynamic behavior. An additional desirable condition is that the control does not disturb the operation of the drive in the low speed region but rather improves its performance. In the control of FIG. 1, the actual value of the torque producing current $i_{1x}$ is used to modify the slip $\omega_2$. Current control is lost in the constant horsepower region when the total available dc link voltage is reached, since the amplitude of the flux and its rate of change is determined by the additional dc link voltage available. However the torque can be modified by the frequency channel, that is, if the speed is measured, the slip command $\omega_2$. The function used to modify the slip according to the torque requirements is the actual value of the torque producing current $i_{1x}$ of a two phase equivalent circuit in the rotor flux fixed reference frame.

The current component is part of the stator current perpendicular to the rotor flux and it can be calculated if the value of the rotor flux and stator current vector are known. From the torque equation it follows:

$$T = n_p(M/L_2)\vec{\psi}_2 X i_1 \tag{6}$$

$$T = n_p(M/L_2)|\vec{\psi}_2||i_1|\sin\theta \tag{7}$$

$$T = n_p(M/L_2)|\vec{\psi}_2|i_{1x} \tag{8}$$

$$i_{1x} = T/(n_p(M/L_2)|\vec{\psi}_2|) \tag{9}$$

or as a function of the $(\alpha,\beta)$ stator fixed current and flux component $$|\psi_2| = \sqrt{\psi_{2\alpha}^2 + \psi_{2\beta}^2} \tag{10}$$

$$T = 3/2 \ (n_p \ (M/L_2)) \ (\psi_{2\alpha} \ i_{1\beta} - \psi_{2\beta} \ i_{1\alpha}) \tag{11}$$

$$i_{1x} = 3/2 \ (\psi_{2\alpha} \ i_{1\beta} - \psi_{2\beta} \ i_{1\alpha})/\sqrt{\psi_{2\alpha}^2 + \psi_{2\beta}^2} \tag{12}$$

The parameter M, the main inductance, $L_2$, the total rotor inductance ($L_2 = L_{s2} + M$) can vary widely, especially when the flux changes, however, the factor $M/L_2$ (which can also be written as $(M/M+L_{s2})$) does not vary appreciably, since the rotor leakage $L_2$ is much smaller than M, and the factor $M/L_2$ is very close to one for any M. The rotor flux vector can be computed from the integration of the stator voltages, with the necessary correction for the stator voltage drops. From the definition of the rotor flux, it follows:

$$\vec{\psi}_1 = \int(\vec{V}_1 - R_1\vec{i}_1)dt \tag{13}$$

$$\vec{\psi}_2 = (L_2/M)\vec{\psi}_1 - L_{s2}\vec{i}_1 \tag{14}$$

For the frequencies of interst, the voltage drop caused by the stator resistance $R_1$, can be neglected which results in $$\psi_{2\alpha} = (L_2/M)\int v_{1\alpha}dt - L_{s2}i_{1\alpha} \tag{15}$$

$$\psi_{2\beta} = L_2/M\int v_{1\beta}dt - L_{s2}i_{1\beta} \tag{16}$$

When $i_{1x}$ is determined according to equation 12, its value can be compared with the commanded $i_{1x}{}^*$ in summer 35, the current control is still in operation (no field weakening) and the error from summer 35 used to correct the value of the rotor time constant in the slip $\omega_2$ determination. If the rotor time constant, which is the ratio of total rotor inductance to rotor resistance in the machine, differs from the value used in the determination of the slip, decoupling between the magnetizing component of the stator current $i_{1y}$ from the torque producing component $i_{1x}$ is not achieved which leads to unwanted saturation or under excitation of the machine.

For the transition into field weakening area of operation, the area between the calculated and commanded $i_{1x}{}^*$ is again determined in summer 35. The output $i_{1x}{}^*$ is limited in limter 31 to take into account breakdown slip, which can be determined from the constant voltage region of operation, taking into account voltage drops in the inverter and power supply.

When the motor is commanded to accelerate, the speed controller 11 will be commanding the maximum value of $i_{1x}{}^*$ as determined in divider 29, when this value cannot be reached because of the lack of voltage reserve, the error will increase the slip command which will change the frequency and phase of the applied voltage until the desired value of the torque producing current is reached. Slip command increases since the calculated value of $i_{1x}$ is less than the commanded value due to the voltage limitation of the dc bus. In this mode of operation, the constant value of $i_{1x}{}^*$, together with the increase in the slip and the constant voltage, result automatically in a reduction of the output torque and flux inversely proportional to speed, and the output active power will be constant. If the drive is already operating in the field weakening area, and is commanded to decelerate, the sign of $i_{1x}{}^*$ and $\omega_2$ will invert, and the reduced speed and constant voltage will increase the flux, and the motor will decelerate with approximately constant torque. When leaving the area of constant voltage, the value of $i_{1x}{}^*$ will coincide wth its commanded value as will the slip, and the current control mode of operation can perform as usual, improved by the correction for the rotor time constant in the slip determination.

Since control is accomplished by adjusting $i_{1x}{}^*$, the $i_{1y}{}^*$ field producing component is free to change acording to the motor speed, voltage available and the rotor time constant. For drives with low inertia, some overshoot in the field can be expected, this however does not jeopardize the operation of the drive, because the overshoot does not product instability in the speed control.

While the motor is running with constant voltage, the current control will be commanding only the switching points for the power switches, the current command is actually a "voltage" command. However, the switching point commanded will take current control immediately whenever the stator currents are sensed as being larger than the commanded current, acting as current limiters.

To keep as much of the dynamic performance of the control when in the constant horsepower mode, the output of the speed controller 11 is divided by a function inversely proportional to speed, namely the flux, in divider 29. This division will increase the gain of the controller in order to keep the overall gain of the system, which has been decreased by the reduced flux in the constant horsepower region, approximately constant.

If the control system is commanded to brake from very high speeds, the rotor flux will reach its rated value at a higher stator frequency than when accelerating to a higher speed. The higher torque and higher speed during braking will cause a very high current in the dc link, which requires power dumping capabilities, such as a shunt regulator or back to back converter connected to the line.

To provide a limit to the power capability, the calculated torque and actual rotor speed are multiplied in multiplier 17 to provide a rough estimation of the actual output power taken from or provided by the drive. Whenever the computer power is larger than a maximum allowed value, the error reduces the maximum value of $i_{1xl}{}^*$ in limiter 31, resulting in a reduction in the output torque and power.

Referring now to FIG. 3 the current control and converter 51 are shown as a vector control and PWM controlled inverter. The commanded value of the torque component of stator current is $i_{1x}{}^*$, a dc quantity in a two phase rotor flux fixed reference frame, and the commanded value of the field component of stator current $i_{1y}{}^*$ is also a dc quantity in a two phase rotor flux fixed reference frame, both of which have to be transformed into an equivalent three phase sinusoidal currents in a stator fixed (i.e. stationary) reference frame to provide suitable current reference waveforms to the PWM current controlled inverter.

Tachometer 121 feedback and an incremental angle encoder 123 feedback are both shown in FIG. 3. In a particular application, either tachometer feedback or an incremental angle encoder, but not both, may be available or neither may be available. When incremental angle encoder feedback is available the slip command $\omega_2{}^*$ is input to a sine and cosine generator 125, which can comprise a two phase oscillator, to generate a sine and a cosine waveform having an angle $\gamma_2$, which is the angle of the rotor flux referred to a rotor fixed axis. The rate of change of $\gamma_2$ is equal to the slip. The incremental angle encoder 123 is connected to the induction motor shaft for measuring the rotor position by generating a cosine and a sine waveform with an angle of $\gamma_m$, where $\gamma_m$ is the angle of the rotor position. An angle adder 126 adds the waveform signals to generate a cosine and a sine waveform having an angle of $\gamma_1$, where $\gamma_1$, is the angle of the rotor flux referred to a stator fixed axis. A rotating to stationary coordinate changer 127 performs the transformation set forth in equations 17 and 18 to provide two phase sinusoidal current signals in the stator fixed or stationary reference frame.

$$i_{1\alpha}{}^* = i_{1x}{}^* \cos \gamma_1{}^* - i_{1y}{}^* \sin \gamma_1{}^* \tag{17}$$

$$i_{1\beta}{}^* = i_{1x}{}^* \sin \gamma_1{}^* = i_{1y}{}^* \cos \gamma_1{}^* \tag{18}$$

A two phase to three phase transformation circuit 129 set forth in equations 19, 20 and 21 provides 3 phase reference sine waves $i_a$, $i_b$ and $i_c$ to a PWM current controlled inverter 131 which receives power from an external 3 phase power source.

$$i_{1a}^* = (3/2) i_{1\alpha} \tag{19}$$

$$i_{1b}^* = (\sqrt{3}/2)(i^*_{i\alpha}) + \sqrt{3}\, i^*_{1\beta} \tag{20}$$

-continued $$i^*_{1c} = (-\sqrt{3}\ (\sqrt{3} + 1)/2)\ i^*_{1\alpha} - 3i^*_{1\beta} \qquad (21)$$

When tachometer feedback is available the analog output signal from tachometer 121 is coupled through an analog to digital converter 135 which provides digital signals indicative of rotor speed to an integrator 137. Integrating the speed provides an angle, $\gamma_m$, where $\gamma_m$ is the angle of the rotor position. A sine cosine generator 139 provides a sin $\gamma_m$ and a cos $\gamma_m$ signal to angle adder 126, instead of the incremental angle encoder 123 providing the sine $\gamma_m$ and cos $\gamma_m$ signals.

If tachometer feedback and incremental angle encoder feedback are both not available, motor terminal voltage can be used to generate reconstructed flux signals in a two phase coordinate system representative of the three phase system. The ALPHA component of the flux and the BETA component of the flux are used to generate a cos $\gamma_1$, and sin $\gamma_1$, signal for the rotating to stationary coordinate change 127. Three phase motor terminal voltage is coupled to an analog three phase to two phase transformation circuit which provides equivalent stator voltages $V_\alpha$ and $V_\beta$ to voltage controlled oscillators 143 and 145, respectively. The voltage controlled oscillator 143 and 145 provide digital signals to integrators 147 and 149, respectively. Offset blocks 151 and 153 provide DC correction to the ALPHA and BETA components of the flux, respectively. A more detailed description of flux reconstruction from machine terminal voltage with DC elimination can be found in copending application entitled "A Method of Digital Flux Reconstruction with DC Elimination" Seymour, et al. Ser. No. 819,279 filed on Jan. 16, 1986 and assigned to the same assignee as the present invention. Application Ser. No. 819,279 is hereby incorporated by reference.

The ALPHA and BETA flux components are supplied to a phase analog resolver to digital converter 155 which provides a signal proportional to the angle of $\gamma_1$. Also provided to the phase analog resolver to digital converter is the torque producing current command $i_{1x}^*$ multiplied by a constant K in gain block 157 to provide compensation for stator leakage inductance.

The angle $\gamma_1$ provided by the phase analog resolver to digital converter is offset to compensate for the stator leakage inductance. A sine and cosine generator 159 receives the $\gamma_1$ angle and provides a cos $\gamma_1$ and sin $\gamma_1$ signal to the rotating to stationary coordinate changer 127. In addition to providing the angle $\gamma_1$ the phase analog to digital converter provides a speed feedback signal which is needed when neither a tachometer nor an incremental angle encoder is available. The speed feedback signal from converter 155 can be used even if a tachometer or an angle encoder is present to provide a feedback signal at high speed. For operation at very low speeds, tachometer or angle encoder information provides more accurate information for machine control than does the speed feedback information determined by processing machine terminal voltage. The flux magnitude and ALPHA and BETA flux components determined from the terminal voltage is preferably used in the torque and flux calculator 19 in FIG. 1.

Figure 5:
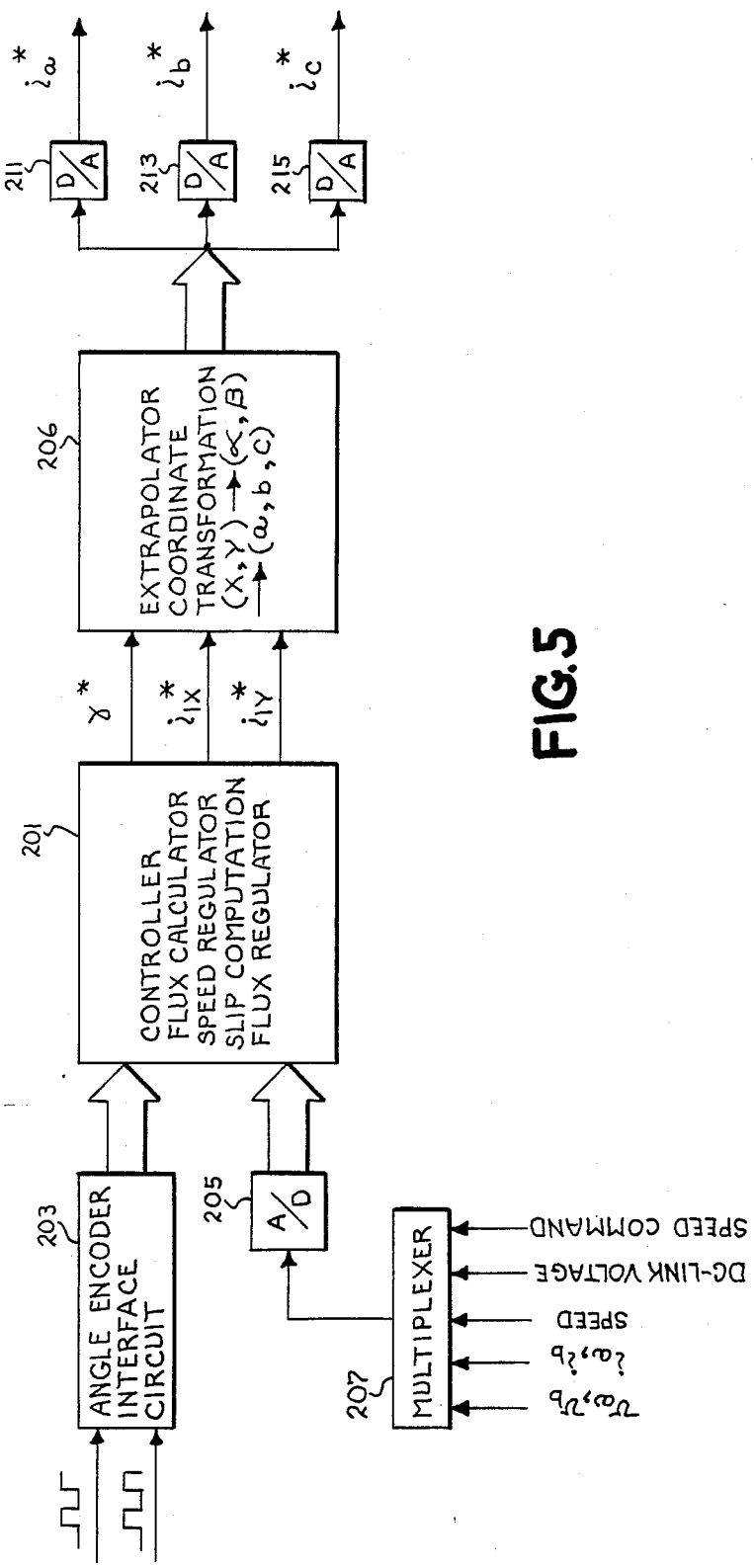
FIG. 5 is a block diagram of a digital implementation of the control of FIG. 1.

FIG. 4 shows the current control and converter 51 implemented as a phase controller rectifier supplying an autosequentially commutated inverter 167 through an inductor 169. The phase controlled rectifier 165 is coupled to a three phase sinusoidal power source. The firing pulses for the SCR's of the phase controlled rectifier are determined in summer 141 by taking the difference between the commanded dc link current $I_a$. The commanded dc link current $I_a^*$ is generated by taking the square root in square root function block 173 of the sum of the squares of the two stator current components in the two phase rotor fixed reference frame, as determined by multipliers 175 and 177, which square each of the stator current components $i_{1x}^*$ and $i_{1y}^*$, respectively, and the sum of the result in summer 179. The firing angles for the autosequentially commutated inverter 167 are determined by combining the commanded slip $\omega_2$ together with rotor speed $\omega_m$ in summer 151 and integrating the result in integrator 153 to obtain an angle $\gamma_1$. The commanded torque component of stator current $i_{1x}^*$ is divided by the field component of stator current $i_{1y}^*$ in divider 185 and the arc tangent of the ratio determined in block 187. The two angles $\gamma_2$, and $\Delta\gamma_2$ are combined in summer 189 and input to a firing angle controller 191 for the autosequentially commutated inverter 137. A block diagram of a hardware implementation of the drive FIG. 1 using the current control controller and converter of FIG. 3 is shown in FIG. 5. Two microprocessors such as an Intel 8051 or equivalent are used. The first microprocessor 201 acts as a drive controller and receives digital signals representative of the rotor position from an angle-encoder interface circuit 203 coupled to the rotor shaft. Angle encoder 203 generates two digital pulse trains. The first pulse train is proportional to rotor speed and the second logical level when the director of rotation is counterclockwise. Two of the induction motor phase voltages and phase currents together with the motor speed, speed command and inverter dc link voltage is coupled to an A/D converter 205 through a multiplexer 207. The controller microprocessor determines the stator current components torque command $i_{1x}^*$ and the stator current components $i_{1y}^*$ flux command as well as the angle $\gamma_1$ which is the angle of the rotor flux referred to a stator fixed axis by a program shown in flow chart form in FIG. 6A to be discussed hereinafter. The second microprocessor 269 is an extrapolator which performs a coordinate transformation from a rotating two phase rotor fixed reference frame to a stator fixed two phase frame and then to a stator fixed three phase reference frame. The second microprocessor is responsive to the three output signals of the first microprocessor and provides three digitally encoded three phase sinusoidal command signals $i_{1a}^*$, $i_{1b}^*$ and $i_{1c}^*$, to three digital to analog (D/A) converter 211, 213 and 215, respectively. The sinusoidal command signals can be coupled to a PWM current controlled inverter. A flowchart representation of the software used to carry out the extrapolation function is shown in FIG. 7A and will be discussed hereinafter. A PWM current controlled inverter receives the three current commands and compares them to the actual motor currents to develop up/down switching signals which bring the appropriate switching elements in the inverter to their appropriate state of conduction or nonconduction.

Figure 6A:
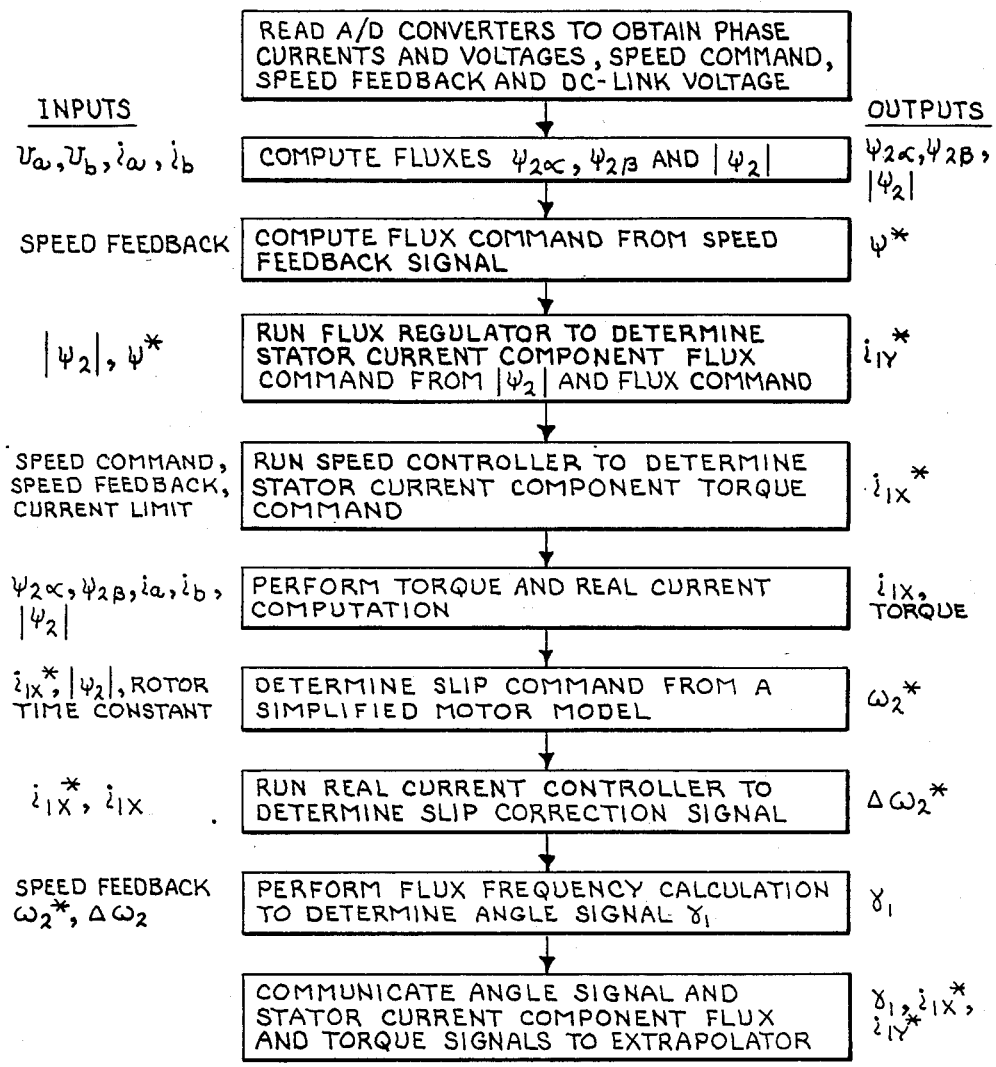
FIGS. 6A and B are flow charts illustrative of the software for implementing the induction drive with the embodiment shown in FIG. 5.

Referring now to FIG. 6A the flow chart for the program implemented in controller microprocessor 201 is shown. The analog to digital converter 205 is read to obtain two of the three motor phase currents $i_{1a}$, $i_{1b}$, two of the three motor phase voltages $v_a$, $v_b$, the speed command, the speed feedback, the rotor angle position and the DC-link voltage. The DC-link voltage is used in determining the maximum power supplied to the motor. Alternatively the product of the motor torque and motor speed could be used. The two phase flux $\psi_{2\alpha}$ and $\psi_{2\beta}$ as well as the absolute magnitude of the flux $\psi_2$ is next determined from the motor phase voltage and currents. A flux command is determined from the speed feedback signal. The stator current component flux command is determined from the flux command and the calculated flux magnitude in a flux regulator program. A speed-controller program determines the stator current component of the torque command $i_{1x}*$ and a signal proportional to the torque from the two phase flux components $\psi_{2\alpha}$, $\psi_{2\beta}$, the two phase currents $i_\alpha$, $i_\beta$, and the flux magnitude $\psi_2$.

A simplified motor model is used for the slip calculation, responsive to inputs of the stator current component torque command, the rotor time constant and the magnitude of the flux, to generate a slip command $\psi_2*$. A real current controller routine compares the commanded stator current component torque command and the error signal is used to generate an adjustment to the slip command $\Delta\omega_2$. A rotor flux frequency computation is next performed to generate an angle signal $\gamma_1*$, which is the angle of the rotor flux referred to the stator fixed axis. The time derivative of $\gamma_1*$ is the stator frequency. The angle of the rotor flux referred to the stator fixed axis is obtained from the time integral of the sum of the speed, slip command and the adjustment to the slip command. The angle $\gamma_1*$, the torque command and the flux command are communicated to the extrapolator.

Figure 6B:
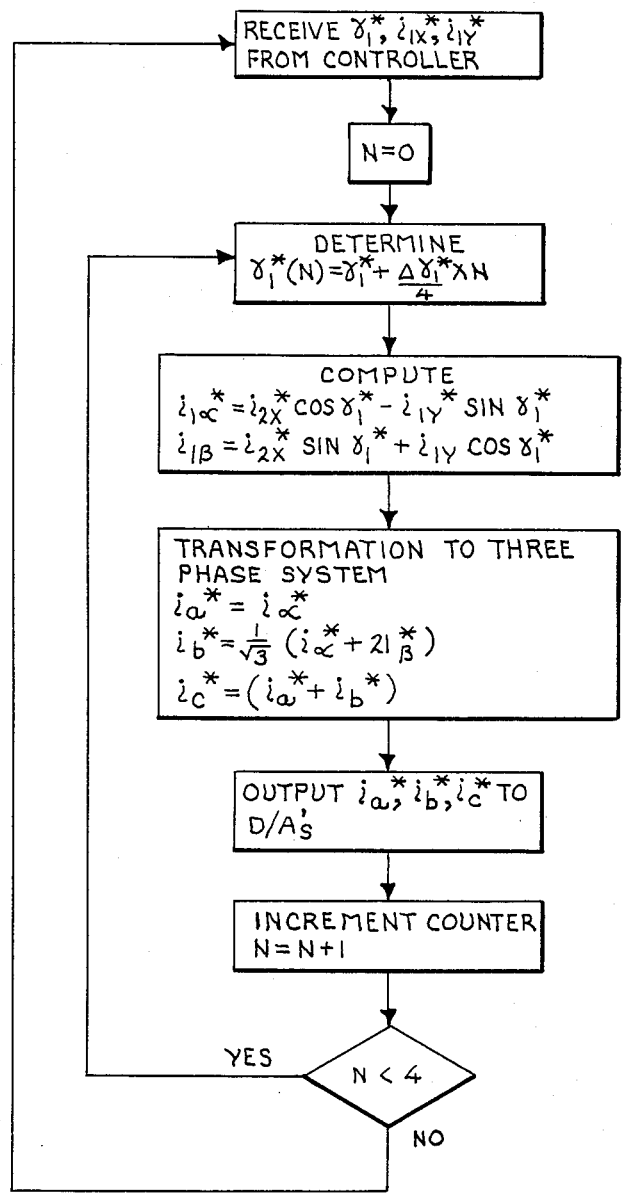

Referring now to FIG. 6B, the flow chart of the extrapolator is shown. The extrapolator receives the angle command $\gamma_1*$, torque command $i_{1x}*$ and flux command $i_{1y}*$ determined by the controller. The controller in the present embodiment takes approximately 1.5 milliseconds to perform the calculation. In order to generate a smooth sinusoidal waveforms to the motor from the inverter at the inverter operating frequencies (200 Hz) it is necessary to update the current command to the inverter more frequently than every 1.5 millisec. To accomplish this, a variable N is set to zero. The angle $\gamma_1$ is set equal to the received value. Next, the two phase stationary currents $i_{1\alpha}$ and $i_{1\beta}$ are determined in accordance with equation 17 and 18.

The current $i_{1\alpha}*$ and $i_{1\beta}*$ are next transformed to a three phase system according to the following equations:

$$i_a* = i_{1\alpha}* \tag{22}$$

$$i_b* = (1/\sqrt{3})(i_{1\alpha}* + 2i_{1\beta}*) \tag{23}$$

$$i_c* = (i_a* + i_b*) \tag{24}$$

The current commands $i_a*$, $i_b*$ and $i_c*$ are sinusoidally varying current commands which are sent to digital to analog converters to a PWM current control inverter every 1.5/4 milliseconds.

The counter N is increased by 1 and in a decision block it is determined if N is less than 4. If N is less than four (4) then the angle $\gamma_1$ is incremented by one quarter of the difference between the most recently received angle command from the controller and the previously received angle command from the controller and three phase sinusoidal current commands are again calculated and sent to the inverter. When N=4, new calculated values of $\gamma_1*$, $i_{1x}*$ and $i_{1y}*$ are obtained from the controller.

The foregoing describes an induction machine drive operable in the constant horsepower region using full inverter voltage while improving the performance capability of the drive in the constant torque, low speed mode of operation.

While only preferred features of the invention have been shown by way of illustration, many modifications and changes will occur to those skilled in the art. It is, therefore, to be understood that the appended claims are intended to cover all such modifications and changes that fall within the true spirit and scope of the invention.

What is claimed is:

1. A control capable of operating an induction machine at full inverter voltage in the field weakening mode comprising:
    means coupled to said induction machine for generating a signal proportional to induction machine speed;
    means responsive to an external speed command signal and machine speed for generating a speed error signal;
    means responsive to said speed error signal for generating a torque producing current command signal;
    means responsive to said torque producing current command signal for generating a slip command signal;
    means responsive to machine voltages and currents for generating a signal proportional to an actual torque producing current signal;
    means responsive to said actual torque producing current signal and said torque producing current command for generating an error signal;
    means responsive to said error signal for generating a slip correction signal;
    means responsive to said slip correction signal for modifying said slip command signal to generate a modified slip command signal, said slip command signal being increased by said slip correction signal when said limited torque producing current signal;
    means responsive to said signal proportional to induction machine speed for generating a flux producing current command signal; and
    current control converter means responsive to said torque producing current command signal, flux producing current command signal, and said modified slip command for generating multiphase, variable frequency currents to said induction machine.

2. A control capable of operating an induction machine at full inverter voltage in the field weakening mode comprising:
    means coupled to said induction machine for generating a signal proportional to induction machine speed;
    means responsive to an external speed command signal and machine speed for generating a speed error signal;
    means responsibe to said speed error signal for generating a torque producing current command signal;
    limiting means responsive to said torque producing current component command signal for limiting the maximum allowed magnitude of said torque producing current command and thereby providing a limited torque producing current command signal;

means responsive to said limited torque producing current command signal for generating a slip command signal;

means responsive to machine voltages and currents for generating a signal proportional to an actual torque producing current signal;

means responsive to said actual torque producing current signal and said limited torque producing current command for generating an error signal;

means responsive to said error signal for generating a slip correction signal;

means responsive to said slip correction signal for modifying said slip command signal to generate a modified slip command signal, said slip command signal being increased by said slip correction signal when said limited torque producing current command signal exceeds said actual torque producing current signal;

means responsive to said signal proportional to induction machine speed for generating a flux producing current command signal; and current control and converter means responsive to said limited torque producing current command signal, flux producing current command signal, and said modified slip command for generating multiphase, variable frequency currents to said induction machine.

3. The control of claim 2 further comprising:

means for determining power supplied to said motor during motoring and by said motor during regeneration; and means for reducing the maximum allowed magnitude of said torque producing current signal by said limiting means when the power supplied to said motor during motoring and the power supplied by the motor during regeneration exceed a predetermined amount.

4. A method of controlling an induction machine to obtain operation in the field weakening mode with full inverter voltage comprising the steps of:

generating a speed error signal from a commanded speed signal and a signal representative of actual motor speed;

generating a torque producing current command from the speed error signal;

generating a signal representative of the actual torque producing current from machine voltages and currents;

generating a slip command from the torque producing current command;

generating a slip correction signal from the difference between the signal representative of the actual torgue producing current and torque producing current command;

modifying the slip command by the slip correction signal so that when the commanded torque producing current exceeds the signal representative of the actual torque producing current the slip command will be increased;

generating a field producing current command responsive to motor speed; and supplying the modified slip command, torque producing current command and field producing current command to the induction motor.

5. The method of claim 4 further comprising the step of:

limiting the maximum allowed magnitude of said torque producing current command.

6. The method of claim 5 further comprising the steps of:

determining the power supplied to said motor during motoring and by said motor during regeneration; and reducing the maximum allowed magnitude of said torque producing current signal by the limiting step when the power supplied to the motor and when the power supplied by the motor exceeds a predetermined amount.

* * * * *